TELEVISION LINEARITY CONTROL MEANS

Filed Sept. 2, 1966

INVENTOR
OSAMU OKUDA

BY Darby & Darby
ATTORNEYS

INVENTOR
OSAMU OKUDA

BY Darby & Darby
ATTORNEYS

United States Patent Office 3,434,001
Patented Mar. 18, 1969

3,434,001

TELEVISION LINEARITY CONTROL MEANS

Osamu Okuda, Osaka, Japan, assignor to Sanyo Electric Company, Ltd., Osaka, Japan, a corporation of Japan Filed Sept. 2, 1966, Ser. No. 576,947
Claims priority, application Japan, Sept. 2, 1965, 40/53,940; Nov. 17, 1965, 40/71,017
U.S. Cl. 315—27 8 Claims
Int. Cl. H01j 29/76; H01f 21/08

ABSTRACT OF THE DISCLOSURE

A linearity control device for a magnetic deflection type cathode ray tube scanning system which produces a forward and reverse bi-directional deflection current signal in which an H-shaped core of magnetically saturable material is provided. A cylindrical permanent magnet which is magnetized across its diameter is mounted with respect to the core such that the axis of the magnet transverse to said diameter is generally transverse to the longitudinal axis of the core. A coil is wound over the elongated center leg of the core and the static magnetic field produced by the permanent magnet acts to cancel the dynamic magnetic field produced by the reverse current signal and add to the dynamic magnetic field produced by the forward current signal.

This invention relates to horizontal deflection systems for cathode ray tubes, and more particularly to improvements of scan linearity control. In horizontal deflection systems of the type commonly employed in transistorized television receivers, horizontal deflection current is supplied to the horizontal deflection coils of the deflection yoke by the cooperative functioning of a driver transistor, an output transformer or autotransformer, and a damper diode or rectifier. While it is desired to provide substantial linearity of the cathode ray scanning trace as a function of time, it does not follow that the deflection current in the horizontal deflection coils should be exactly linear. In scan systems utilized in transistorized television circuits, movement of the cathode ray beam generally is not a linear or constant function of time but rather has a characteristic of shortened scan width on the right and extended scan width on the left of the cathode ray tube.

A primary object of the present invention is to overcome the objections of prior transistorized television receiver scanning systems above described, and to provide improved means for achieving substantial scan linearity during the scan interval.

Another object of the present invention is to provide a novel arrangement for eliminating or minimizing certain undesired types of non-linearity in the deflection current waveform applied to the horizontal deflection coils of cathode ray deflection systems.

A further object of the invention is to provide an improved reactor means in such systems for enabling easy adjustment of horizontal linearity.

An additional object of the invention is to provide simple, efficient and inexpensive arrangements for effecting wave shape control in such systems.

The details of operation of transistor type horizontal deflection systems of the type here involved are well known. Hence, it is unnecessary to fully describe such details. It is sufficient to emphasize that during the trace portion of successive scanning cycles, the deflection current waveform tends to have a characteristic of shortened scan width on the right edge and of extended scan width on the left edge of cathode ray tube screen.

To overcome this defect, in a preferred embodiment of the invention, an auxiliary inductor is provided in series with the deflection coils and is magnetically biased so as to exhibit a non-symmetrical hysteresis loop or magnetic saturation characteristic, in order to present one impedance characteristic to forward current flow while presenting a substantially different impedance characteristic to reverse current flow therethrough. Further, in accordance with the preferred embodiment of the invention, the auxiliary inductor is provided with means for variably adjusting the degree of magnetic biasing for variably adjusting the nominal or average reactance in order to provide for adjustment of the horizontal scan linearity or picture linearity of transistorized television receivers. More specifically, the present invention operates a variable inductor as a function of time and makes the inductance of the inductor maximum on the left edge and minimum on the right edge of the scanning trace. This improves the trace linearity. The foregoing and other concepts and objects of this invention will be apparent from the following description taken with the accompanying drawing, throughout which like reference characters indicate like parts, which drawing forms a part of this application, and in which:

Figures 1, 2, 3, 4:
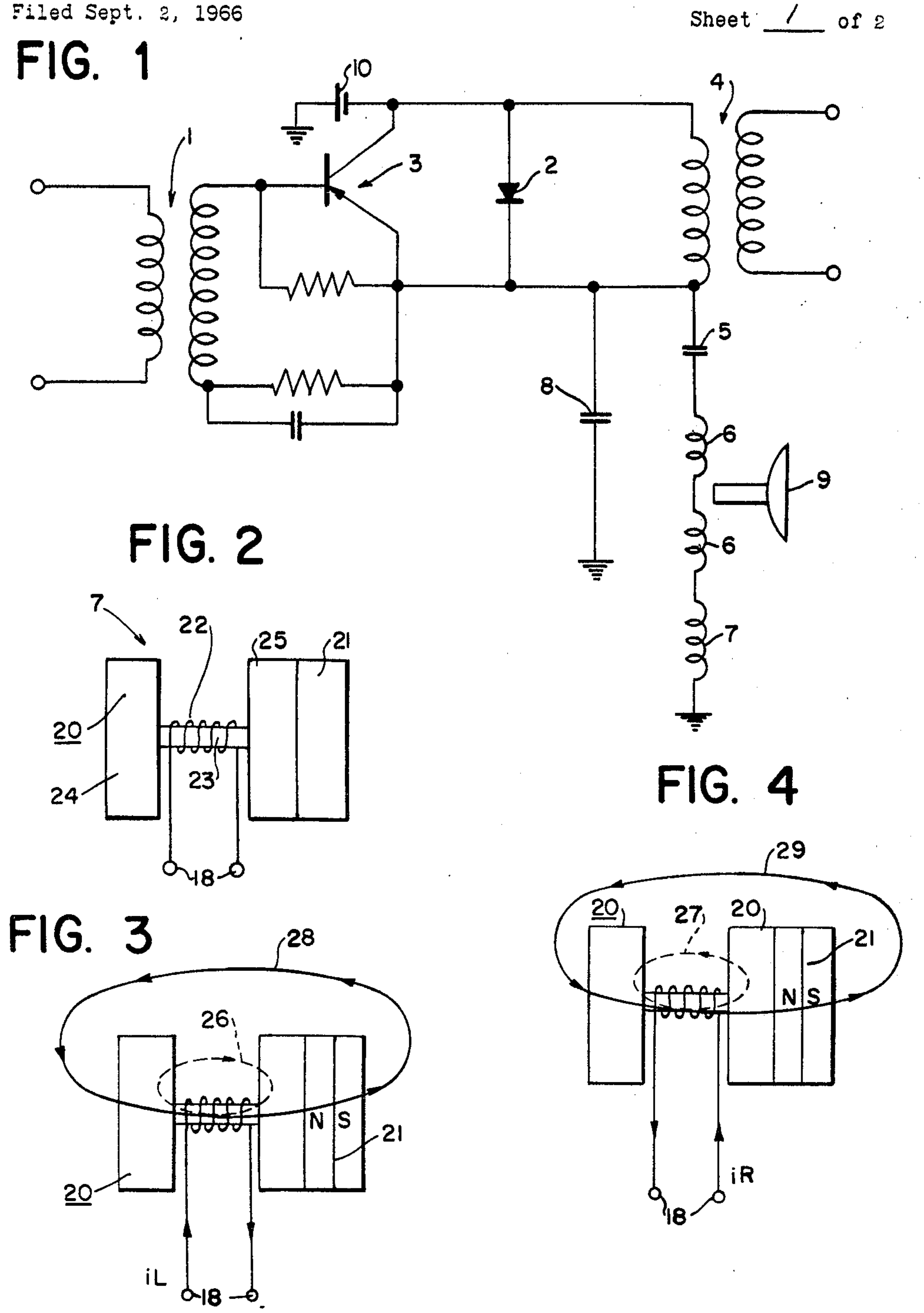
FIGURE 1 is a simplified schematic diagram of the pertinent portion of a conventional transistorized horizontal deflection system, which diagram is useful in explaining the theory and principles of the present invention.
FIGURES 2, 3 and 4 are simplified views of structures, useful in explaining the theory and principles of the present invention.

The concepts of the present invention may be best understood by first considering in some detail the somewhat idealized horizontal deflection system illustrated by FIGURE 1. The deflection system comprises a driver transistor 3, the horizontal output transformer 4, the damper rectifier 2, and horizontal deflection coils represented at 6, 6. The deflection coil 6, 6 normally comprise part of the deflection yoke for the cathode ray tube 9. The other inductance of the circuit is represented by element 7 in series with coils 6, 6. In accordane with conventional practice, the collector of the driver transistor 3 is connected to one end of the primary winding of transformer 4. The two halves of the deflection coil winding 6, 6 are connected in shunt with the primary of the transformer 4 while the damper rectifier 2 also is connected in shunt with the primary. The deflection coil winding 6, 6 also is shunted by a capacitor 8 which represents all the distributed capacitance, stray capacitances and actual shunt capacitances in the system including the capacitances which are reflected from the primary circuit of transformer 4.

In operation of such an idealized horizontal deflection system represented in FIG. 1, negative going horizontal synchronizing signals are supplied through transformer 1 from the horizontal synchronizing circuits of the receiver (not shown) to the base of the driver transistor 3. The latter serves as a switch to control the supply of energy, represented by a source of B+10, to the horizontal deflection coils 6, 6.

The driver transistor 3 and the damper rectifier 2 are conductive during different portions of each scanning trace interval. The deflection current in the deflection coils 6, 6 during the trace interval is the algebraic sum of the transformed output current of transistor 3 and the damper rectifier current. Specifically, during the first half of the trace interval, the damper rectifier 2 conducts to permit a so-called "reverse" electron current to flow upwardly through the deflection coils 6, 6 and return to source 10 of B+ through the rectifier 2. During the latter half of the trace interval, the damper rectifier is rendered non-conductive, driver transistor 3 forces a sawtooth current through the horizontal coils 6, 6 of yoke, and "forward" electron current flows downward. At the end of the trace interval, the coils 6 are conducting a maximum forward current and therefore have maximum inductive energy stored therein. At the beginning of the retrace interval, driver transistor 3 is abruptly rendered non-conductive by the negative going edge of the input sync signal. Accordingly, during the first half of the retrace interval, the inductive energy in winding deflection coil 6, 6 is transferred to capacitor 8 with the voltage on capacitor 8 rising to a maximum and the current through the coils 6, 6 falling to zero.

Figure 5:
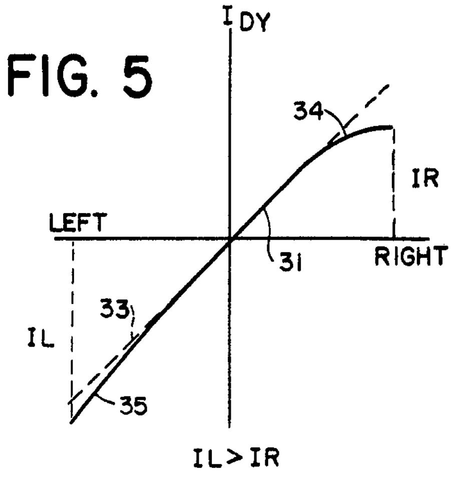
FIGURES 5 and 6 are graphs of current and inductance, useful in explaining the concepts and operation of the present invention.

In FIG. 5, solid line curve 31 indicates the generally exponential sweep waveform which is produced by the circuit of FIG. 1. The curve 31 is represented as the following function:

$$I_{DY} \propto \frac{1}{L_{DY}+L_{IN}}$$

where:

$I_{DY}$=current through deflection coils 6, 6
$L_{DY}$=inductance of the deflection coils 6, 6
$L_{IN}$=inductance of the inductor 7

As shown in FIG. 5 the amplitude of the generally sawtooth horizontal deflection current of transistorized television receiver is centered about a base line and is greater at the start of the scanning trace ($I_L$ corresponding to the trace being at the left edge of the CRT) and smaller at the scanning finish ($I_R$ corresponding to the trace being at the right of the CRT). This gives rise to a non-linear trace scan and causes distortion in the displayed picture.

In accordance with the present invention, to improve the aforesaid bad scanning condition the inductance of inductor 7 is made non-linear to vary as a function of time to enlarge the inductance of inductor 7 at the time of the start of the trace (left edge) and reduce inductance of inductor 7 near the end of the trace (right edge). As should be clear from Equation 1, this will change the value of $I_{DY}$.

The physical construction of an asymmetrically non-linear inductor 7 useful in the present invention is shown in FIG. 2. Here the inductor 7 comprises coil 22 of a number of turns of wire wound in a plurality of layers on an elongated cylindrical core portion 23 between guard members 24 and 25 of an H-shaped core 20. In a preferred embodiment, approximately 22 turns of 0.3 wire is used. On the outer face of the guard member 25 there is secured a permanent magnet 21 which preferably is formed of ferrite material and is magnetized to have its north pole at the face adjacent guard 25 and its south pole at the face remote from guard 25.

Figure 6:
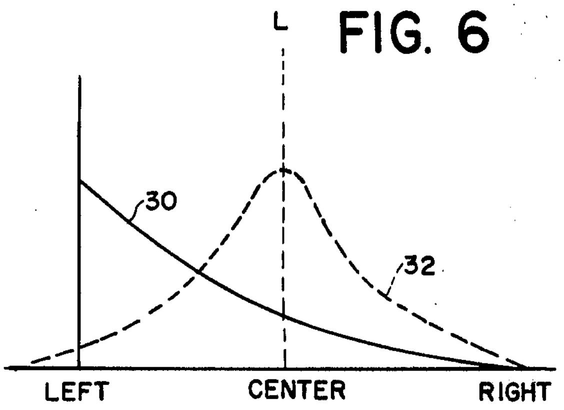

With the structure of FIG. 2, horizontal deflection signals are applied to coil 22 via the input terminals 18, 18. In FIG. 6, dotted line curve 32 indicates the inductance of coil 22 of H-shaped core 20, operating without the permanent magnet 21 in response to the sawtooth signal. As shown, its inductance becomes small at the start of the scanning trace and at the finish and maximum at the center. This occurs because the core 20 saturates in response to the higher amplitude current at the ends of the sawtooth type trace, such as that shown in FIG. 5, thereby causing its inductance to decrease at these points.

Considering the structure of FIG. 2 with permanent magnet 21 attached, as shown in FIG. 3, the overall flux path of left scanning current $I_L$ (FIG. 5) makes flux loop 26 in the direction shown by the arrow and the permanent magnet 21 makes flux loop 28 in the opposite direction as shown by its arrow. Since the directions of magnetic line of force flux loops 26 and 28 are opposite the magnetic field of flux loop 26 is cancelled by flux loop 28, so that H-shaped core 20 is saturated very little, if any, and the inductance of the inductor stays high or at maximum.

In FIG. 4 the overall flux path of right scanning current $I_R$ makes flux loop 27 the direction shown by the arrow and permanent magnet 21 makes flux loop 29 at the direction of the arrow shown thereon. Since the directions of flux loops 27 and 29 are the same, the magnetic field of flux loop 29 is added to flux loop 27 so that H-shaped core 20 is in maximum saturation and the inductance of inductor 7 becomes minimum.

In FIG. 6, solid line curve 30 indicates the inductance of inductor 7 produced by the inductor structure of FIG. 2, with magnet 21. As seen, inductor 7 provides a maximum auxiliary inductance in the deflection coil circuit at the start (left edge) of the trace. This variable inductance effect limits the rate of change of deflection coil current and changes the deflection coil current wave $I_{DY}$ from that shown by curve 31 in FIG. 5 to that shown by dotted curve 33.

As shown in FIG. 6, at the end of the trace, inductor 7 provides a minimum auxiliary inductance in the deflection coil circuit. It therefore provides minimum limiting for the rate of change of deflection coil current. This changes the deflection coil current waveform from that shown by curve 31 to that shown by dotted curve portion 33. Thus, the smaller and greater amplitude portions 34 and 35 of the deflection current waveform moving the electron beam near the edges of the CRT screen compensates for the non-linear sweep waveform characteristics which normally exist in the sweep circuits of transistorized television receivers.

Figure 7:
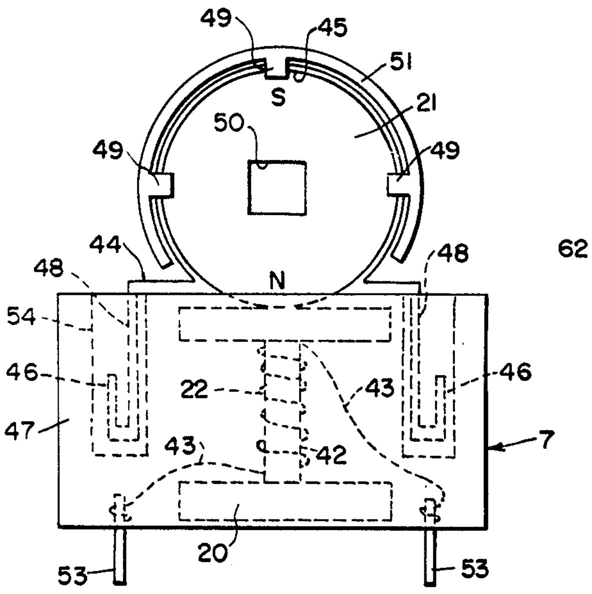
FIGURE 7 is a side view showing one embodiment of my invention.

FIG. 7 shows one embodiment of the present invention. The inductor 7 comprises H-shaped core 20, circular permanent magnet 21 and coil 22. Terminals 53, 53 are connected to coil 22 with lead wires 43, 43 to enable the inductor 7 to be connected in series with the deflection coils 6, 6. A magnet holding device 44 includes a circular strap 45 to hold magnet 21 to a mounting block 47 of insulating material support legs 48, 48 with reverse bent ends 46, 46. The holding device 44 is preferably made of spring metal. The H-shaped core 20 and linearity coil 22 are buried in the insulated material base 47, e.g. such as by potting. A curved cover 51 is placed over strap 45 and has projections 49 to hold it thereto. The permanent magnet 21 has a center hole 50 and is able to be rotated by a tool inserted in hole 50. This permits the direction of the flux loop setup, the permanent magnet to be changed so that the linearity of the sweep waveform can be varied. The H-shaped core 20 with linearity coil 22 is buried within insulated material base 47 and is arranged to contact the circular magnet 21. The support legs 45, 45 of the magnet holding device 44 are inserted and held in holes 54, 54 of base 47. The H-shaped core 21 is always held in contact with magnet 21 by the spring action of holding device 44.

Figure 8:
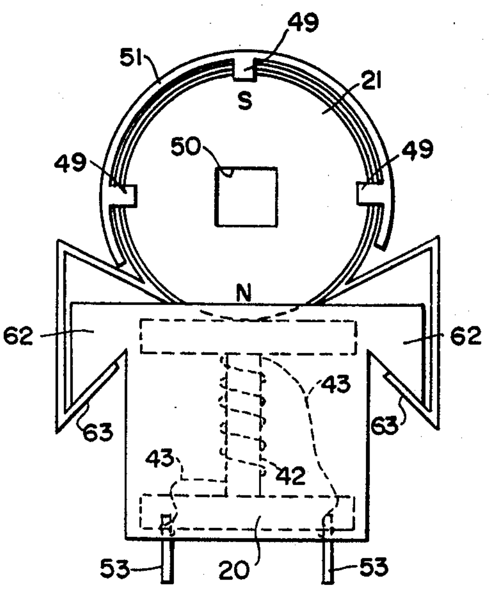
FIGURE 8 is a side view of another embodiment of my invention.

FIG. 8 shows another embodiment of the invention. Here, base 47 has slanted projection 62, 62. The support legs of the magnet holding device 44 have reverse-bent slanted ends 63, 63 placed over the slanted projections 62, 62. This attaches magnet 21 to base 47 and resiliently holds it in contact with H-shaped core 20.

Rotating magnet 21 with respect to linearity coil 22 and the core 20 in either embodiment of FIGS. 7 or 8, increases or reduces the average inductance of the inductor 7. Thus the inductor 7 with adjustable magnet 21 provides means for adjusting the scan linearity or raster linearity on the cathode ray tube 9.

While there has been shown and described a preferred embodiment of the present invention, other modifications thereof will readily occur to those skilled in the art. It will be obvious to those skilled in the art that the present invention is not limited to the signal embodiment shown and described but is susceptible of various changes and modifications without departing from the spirit and scope of the invention.

What is claimed is:

1. A linearity control device for connection to the magnetic deflection circuit of a cathode ray tube scanning system which produces a forward and reverse bi-directional deflection current signal, comprising:

an elongated core of magnetically saturable material having a longitudinal axis, a coil wound over said core with its longitudinal axis generally parallel to the longitudinal axis of the core for receiving the bi-directional current from the magnetic deflection circuit, the coil and the core having a variable inductance parameter in response to the magnetic field produced therein by the deflection signal current saturating the core, and a permanent magnet which is magnetized across its diameter rotatably mounted adjacent to one end of said core such that the axis of the magnet transverse to said diameter is generally transverse to the longitudinal axis of the core, the static magnetic field produced by said permanent magnet acting to cancel the dynamic magnetic field produced by the reverse current signal and adding to the dynamic magnetic field produced by the forward current signal.

2. A linearity control device as in claim 1 wherein said core is generally H-shaped with an elongated center leg located between two guard portions, said coil being wound on said center leg and said permanent magnet being mounted on one of said guard portions.

3. A linearity control device as set forth in claim 2 wherein said magnet is generally cylindrical in shape.

4. A linearity control device as in claim 3 further comprising a mounting base for holding the H-shaped core, and a strap engaging said magnet and connected to said base for holding the magnet to the guard portion.

5. A linearity control device as in claim 4 wherein said base is formed with a pair of projections and said strap is bent over said projections.

6. A linearity control device as in claim 1 further comprising in combination a transistor driver, deflection coil means, means connecting said coil of the control device to said deflection coil means, means connected to said transistor driver and said deflection coil means to produce a generally sawtooth current signal which changes about a base line reference point.

7. A linearity control device as in claim 6 wherein said core is generally H-shaped with an elongated center leg located between two guard portions, said coil being wound on said center leg and said permanent magnet being mounted on one of said guard portions.

8. A linearity control device as set forth in claim 7 wherein said magnet is generally cylindrical in shape.

References Cited

UNITED STATES PATENTS

| | | | |
|---|---|---|---|
| 2,599,068 | 6/1952 | Potter | 336—110 X |
| 2,702,874 | 2/1955 | Adler | 315—27 X |
| 2,702,875 | 2/1955 | Bridges | 315—27 X |
| 2,802,140 | 8/1957 | Mattingly | 336—110 X |
| 3,153,174 | 10/1964 | Claypool et al. | 315—27 X |
| 3,200,288 | 8/1965 | Tanner | 315—27 |
| 3,359,519 | 12/1967 | Pieters | 336—110 |

C. L. WHITHAM, *Assistant Examiner.*

RODNEY D. BENNETT, *Primary Examiner.*

U.S. Cl. X.R.

336—110